US008075727B2

(12) United States Patent
Gerhard

(10) Patent No.: US 8,075,727 B2
(45) Date of Patent: Dec. 13, 2011

(54) METHOD FOR JOINING SECTIONS OF THERMOPLASTIC CONTINUOUS WEB MATERIAL

(75) Inventor: Klaus Hering Gerhard, Ransbach-Baumbach (DE)

(73) Assignee: 3M Innovative Properties Company, St. Paul, MN (US)

( * ) Notice: Subject to any disclaimer, the term of this patent is extended or adjusted under 35 U.S.C. 154(b) by 265 days.

(21) Appl. No.: 12/486,510

(22) Filed: Jun. 17, 2009

(65) Prior Publication Data

US 2009/0250167 A1   Oct. 8, 2009

Related U.S. Application Data

(60) Division of application No. 11/157,111, filed on Jun. 20, 2005, now Pat. No. 7,559,351, which is a continuation of application No. 10/193,661, filed on Jul. 11, 2002, now Pat. No. 6,907,912, which is a continuation of application No. PCT/DE00/00070, filed on Jan. 11, 2000.

(51) Int. Cl.
*B32B 37/00* (2006.01)
*B29C 65/00* (2006.01)

(52) U.S. Cl. ............... 156/308.4; 156/197; 156/290

(58) Field of Classification Search .................. 156/220, 156/290, 292, 308.2, 308.4, 309.6, 221, 297
See application file for complete search history.

(56) References Cited

U.S. PATENT DOCUMENTS

| | | | |
|---|---|---|---|
| 2,821,616 A | 1/1958 | Spott | |
| 2,951,145 A | 8/1960 | Anspach | |
| 2,968,712 A | 1/1961 | Runkle | |
| 2,975,263 A | 3/1961 | Green et al. | |
| 3,007,834 A | 11/1961 | Moeller et al. | |
| 3,077,533 A | 2/1963 | Rohr et al. | |
| 3,134,705 A | 5/1964 | Moeller | |
| 3,162,765 A | 12/1964 | Cran | |
| 3,283,118 A | 11/1966 | Runkle | |
| RE26,287 E | 10/1967 | Wasilisin et al. | |
| 3,356,555 A | 12/1967 | Jackson | |
| 3,379,594 A | 4/1968 | Bruder | |

(Continued)

FOREIGN PATENT DOCUMENTS

CH   684589 A5   10/1994

(Continued)

OTHER PUBLICATIONS

U.S. Appl. No. 09/934,177, filed Aug. 21, 2001; In re: Hering et al.; entitled *Method and Apparatus for Joining Pieces of Thermoplastic Material to Form Cellular Blocks*.

*Primary Examiner* — John Goff
(74) *Attorney, Agent, or Firm* — Dena M. Ehrich

(57) ABSTRACT

A method for joining pieces of a thermoplastic web material in order to form an expandable cellular block, includes steps of positioning a new piece to be added to the cellular block in opposing face-to-face relation with a last piece most recently previously welded to the cellular block, positioning a heating device having a plurality of heating fingers between the last piece and the new piece and in contact with the opposing surfaces of the pieces, causing the heating fingers to heat the pieces at locations contacted by the heating fingers, and retracting the heating fingers from between the pieces and then pressing the new piece against the last piece such that the new piece is welded to the last piece at the locations heated by the fingers.

7 Claims, 2 Drawing Sheets

U.S. PATENT DOCUMENTS

| | | |
|---|---|---|
| 3,675,522 A | 7/1972 | Hull |
| 4,174,987 A | 11/1979 | Belvin et al. |
| 4,921,744 A | 5/1990 | Mitsui et al. |
| 4,957,577 A | 9/1990 | Huebner |
| 4,992,132 A | 2/1991 | Schmidlin et al. |
| 5,039,567 A | 8/1991 | Landi et al. |
| 5,102,485 A | 4/1992 | Keeler et al. |
| 5,131,970 A | 7/1992 | Potter et al. |
| 5,139,596 A | 8/1992 | Fell |
| 5,217,556 A | 6/1993 | Fell |
| 5,252,163 A | 10/1993 | Fell |
| 5,277,732 A | 1/1994 | Meier |
| 5,296,280 A | 3/1994 | Lin et al. |
| 5,312,511 A | 5/1994 | Fell |
| 5,354,394 A | 10/1994 | Seebo et al. |
| 5,399,221 A | 3/1995 | Casella |
| 5,421,935 A | 6/1995 | Dixon et al. |
| 5,549,773 A | 8/1996 | Henderson et al. |
| 5,571,369 A | 11/1996 | Dixon et al. |
| 5,635,273 A | 6/1997 | Dixon et al. |
| 5,670,001 A | 9/1997 | Huebner et al. |
| 5,735,986 A | 4/1998 | Fell |
| 5,746,879 A | 5/1998 | Huebner et al. |
| 5,792,295 A | 8/1998 | Huebner et al. |
| 5,879,780 A | 3/1999 | Kindinger et al. |
| 5,897,730 A | 4/1999 | Huang |
| 5,935,376 A | 8/1999 | Fell |
| 6,146,484 A | 11/2000 | Alam et al. |
| 6,907,912 B2 | 6/2005 | Gerhard |

FOREIGN PATENT DOCUMENTS

| | | |
|---|---|---|
| DE | 1479016 B | 10/1962 |
| DE | 19830380 A1 | 1/2000 |
| DE | 19916842 A1 | 10/2000 |
| DE | 199 28 712 C1 | 11/2000 |
| EP | 0 336 722 A2 | 10/1989 |
| EP | 0531251 A2 | 3/1993 |
| GB | 2 188 166 A | 9/1987 |
| WO | WO 93/01048 A1 | 1/1993 |
| WO | WO 98/42604 A2 | 10/1998 |

METHOD FOR JOINING SECTIONS OF THERMOPLASTIC CONTINUOUS WEB MATERIAL

CROSS-REFERENCE TO RELATED APPLICATIONS

This application is a division of U.S. patent application Ser. No. 11/157,111, filed Jun. 20, 2005 (now U.S. Pat. No. 7,559, 351), which is a continuation of U.S. patent application Ser. No. 10/193,661, filed Jul. 11, 2002 (now U.S. Pat. No. 6,907, 912), which is a continuation of International Patent Application No. PCT/DE00/00070, filed Jan. 11, 2000, designating the U.S. and published under PCT Article 21(2) in German, all of which are incorporated herein in their entirety by reference.

BACKGROUND OF THE INVENTION

This application concerns a procedure for joining cut pieces of a thermoplastic roll material.

SUMMARY OF THE INVENTION

A procedure is described herein for joining cut pieces of a thermoplastic roll material. The material can be, for example, a fleece type material consisting of thermoplastic synthetic fibers. The intention is to so bond a multiplicity of the cut strips ("cuts") of fibrous thermoplastic fleece and/or roll material, that the cured block of bonded strips may be mechanically expanded. The present description also includes a device for joining cut pieces of a thermoplastic roll material.

The procedure can create a low density block material out of thermally bonded, fibrous, thermoplastic roll and/or sheet material, which can easily become a component in the construction of objects, where its properties are of particular use. This procedure is intended to create a block material, which can be manufactured without the use of chemical adhesives or glue and without pre-folding of the roll material, and which may be expanded once joined together. Furthermore, a device shall be created, which can manufacture such expandable block materials, which permits a high rate of production. Further advantages of the process are evident from a perusal of the following description.

In accordance with one aspect of the present disclosure, a method includes steps of:

a) positioning each first cut piece parallel with the last cut piece, and all those in between, within each newly created block of cut pieces;

b) the first strips, which are lying opposite one another in the block, shall be heated to the material's welding temperature on the surfaces of the first and last cuts;

c) the surfaces of the first and last cuts of each block are joined in such a way, that the first strips of both cuts meet, at which point the last cut piece is pressed onto the first piece, whereby the two are welded or thermally fused;

d) a second cut is brought in a parallel position to the first cut, whereby the flat sides oppose each other;

e) the surfaces of the first and second cuts, opposing second strips, which are set apart by approximately double the strip width, against the first strips, are heated to the material's welding temperature;

f) the second cut and the first cut are joined, such that the strips meet, whereby a weld, or thermal fusion occurs, when the first strip is pressed into the second strip; and g) the steps (a) through (f) are continuously repeated with many further cuts.

Through this procedure, expandable hobe-material is created without the use of adhesives or pre-folding of the roll material. This procedure is suitable for reaching high production speeds. Cutting of single strips, of rolls of the material, a separate procedure, which are later joined by the aforementioned method, precedes this joining procedure. However, it is possible to produce directly from pre-cut pieces, if they are delivered as such. The product of the procedure, which is the subject matter hereof, is the hobe-material, which is delivered as is to end-users, for further work, as this provides for an optimum use of freight space. Of course, it is also possible to expand the hobe-material directly behind the production device, as part of the overall process. Through the described procedure, the hobe-material block is created via cyclical addition of cuts, whereby its cross section is determined by the choice of the cut width. The width of the material (which corresponds to the roll width of the original thermoplastic roll material) can be up to 5.2 m or more. The height of the produced block material corresponds to the width of the roll cuts, which can be freely chosen by the operator.

In accordance with one embodiment, the cut, which is to be added, and the produced block of cuts, which is facing the new cut to be added, are moved towards one another in steps (c) and (f). This way, an extended compression time is available for welding strips together, which has positive effects on the weld quality.

In accordance with a preferred execution form of the procedure, the added cut, and the produced block of cuts, are moved in steps (c) and (f), during and/or after the point of contact, by the thickness of one cut parallel to the production direction. Simultaneously with the addition of a new cut, the produced block is, therefore, moved by the thickness of said cut, towards the production direction.

Preferably, the newly produced block of cuts is held or wedged under some pressure exerted vertically against the production direction. This wedging or pressure is applied across the front area of the block rank, where the block is produced. This pressure is adjustable and thus enables the adjustment of the pressure used for and during compression and welding of each new cut or the pressure with which each new cut is joined with the preceding block.

Appropriately, in order to create newly expanded honeycomb material, one heats the block, which was created via steps (a) through (g), to a temperature which enables plastic deformation and then expands vertically from its constituent cuts, i.e. towards the production direction.

Surprisingly, it has been found that the hobe-material block can be expanded under heating conditions, shortly after its creation, without the risk of separation or even stressing of the newly formed welds. In this case, the heat required for the plastic deformation, which is used for expansion purposes, is lower than the heat required for welding purposes. For example, in the case of roll material made of polypropylene fibers, heating between 75 to 85° C. is sufficient for expansion, whereas the welding temperature lies above 120° C., up to 165° C.

Preferably, heating of the produced block occurs via infrared light. The advantage of infrared light heating is that the heat remains within the blocking rank, where a partial expansion has already taken place. The radiant heat (or another form of heating) is directed into the spaces opened up as a result of the partial expansion in order that a fairly even heating of the entire block cross section will result.

Preferably one transports the cuts on a circular path, cyclically, into the welding position in front of the block of joined cuts. This way, many cuts can be transported, one after the other, on a rotor, which thus enables high rates of production speed.

The purpose is further reached via a device, which joins a multiplicity of cuts of a thermoplastic roll material to form an expandable block of such cut strips. According to this aspect of the present disclosure, the device will contain an open-ended magazine to accept the newly formed block of cuts, as well as a rotor, which is positioned in front of this magazine, complete with several stations, which are distributed evenly about the circumference of the rotor. Each such station contains:

a) a mechanism for carrying the cut strips, which can reach beyond the width of the cut;

b) a strip heating mechanism, which is oriented towards the strip carrying mechanism, which can be driven back and forth between a position in front of the strip carrying mechanism and a position that is pulled back from the strip carrying mechanism;

c) a pressure mechanism, which is oriented towards the strip carrying mechanism.

Preferably, the pressure mechanism is arranged in the rotor turning direction, behind the strip carrying mechanism.

The rotor is located between the open-ended magazine and a transfer station. At the stationary transfer station, the rotor takes on each newly cut strip ("cut") and transports it towards the transfer magazine, which already contains the block, which has been produced thus far. The welding, or heat fusion, between the newly cut and correctly positioned strip and the previously produced block, occurs in this position, in front of the magazine. The stations, which are distributed about the circumference of the rotor have several functions. They take on and transport each newly cut strip to the welding position in front of the magazine. They heat up the opposing surfaces of the last strip, which is on the previously produced block, as well as the newly cut, transported and weld-positioned strip and effect the pressure, through which the weld between these two strips occurs, by squeezing one into the other, while adequately heated.

According to the preferred execution form of the device, the rotor is equipped with an even number of stations and the strip heating mechanisms are axially offset from one station to the next. This way, each of the cuts, or strips, which are constituents of the produced blocks, are provided with offset welded strips, as required. At the conclusion of this process, the produced hobe-block can then be expanded to reveal a honeycomb material whereby each honeycomb cell has six equidistant sides. The even number of stations on the rotor can be freely chosen as the size of the rotor will permit; e.g. six or eight stations are a practical number. The offset of the strip heating mechanisms of neighboring stations equals twice the width of the welding strip in the production of honeycomb material. The pressure mechanisms can extend across the entire width of the strip carrying mechanism. However, it is only across the width of the welding strip, that the pressure mechanisms can exert their pressure. In this case, the pressure mechanisms as well as the strip heating mechanisms are offset from station to station.

According to the preferred execution form, the pneumatically driven strip carrying mechanisms are provided with drilled holes, which can be connected to a negative pressure source. At the transfer station, each cut or strip will be transferred onto the strip carrying mechanism by suction and thus held in place. In the welding position, in front of the magazine, once heating of each strip, via the strip heating mechanisms, has occurred, the negative pressure is disengaged, so that each strip is available for immediate welding, whereby the pressure mechanism then presses the correctly prepared strip into the last strip of existing block, which has thus grown by a further attached strip.

Appropriately, the strip heating mechanisms consist of a number of chamber-like heating elements, which are offset from station to station by twice the width of the welding strip. The strip heating mechanisms on the rotor can be substituted with other strip heating elements of another width and an appropriately (and differently) sized distance of the chamber-like heating elements. In this way, one may adjust the honeycomb cell size.

Preferably, the pressure mechanisms are roller-shaped. The rollers can be equipped with an adjustable spring loading mechanism so that the pressure exerted along the welding strips, in concert with the wedging of the produced block in the magazine, can be adjusted as required.

When the task at hand is to turn hobe-material into expanded honeycomb material, the magazine has to be equipped with a heater and at least one pair of expansion rollers. The heater can consist of a single-sided or a double-sided set of infrared lamps. Appropriately, the heat will be directed towards the welding strips, after the partial expansion and towards the consequently created channels. The expansion rollers are in fact brush rollers, or rollers that have been provided with an elastic material, such that the block, which is intended to be expanded, suffers no damage during the expansion process.

BRIEF DESCRIPTION OF THE DRAWINGS

One execution form of the disclosed device will be further detailed in the attached drawing. The following are shown.

DETAILED DESCRIPTION OF THE DRAWINGS

Figure 1:
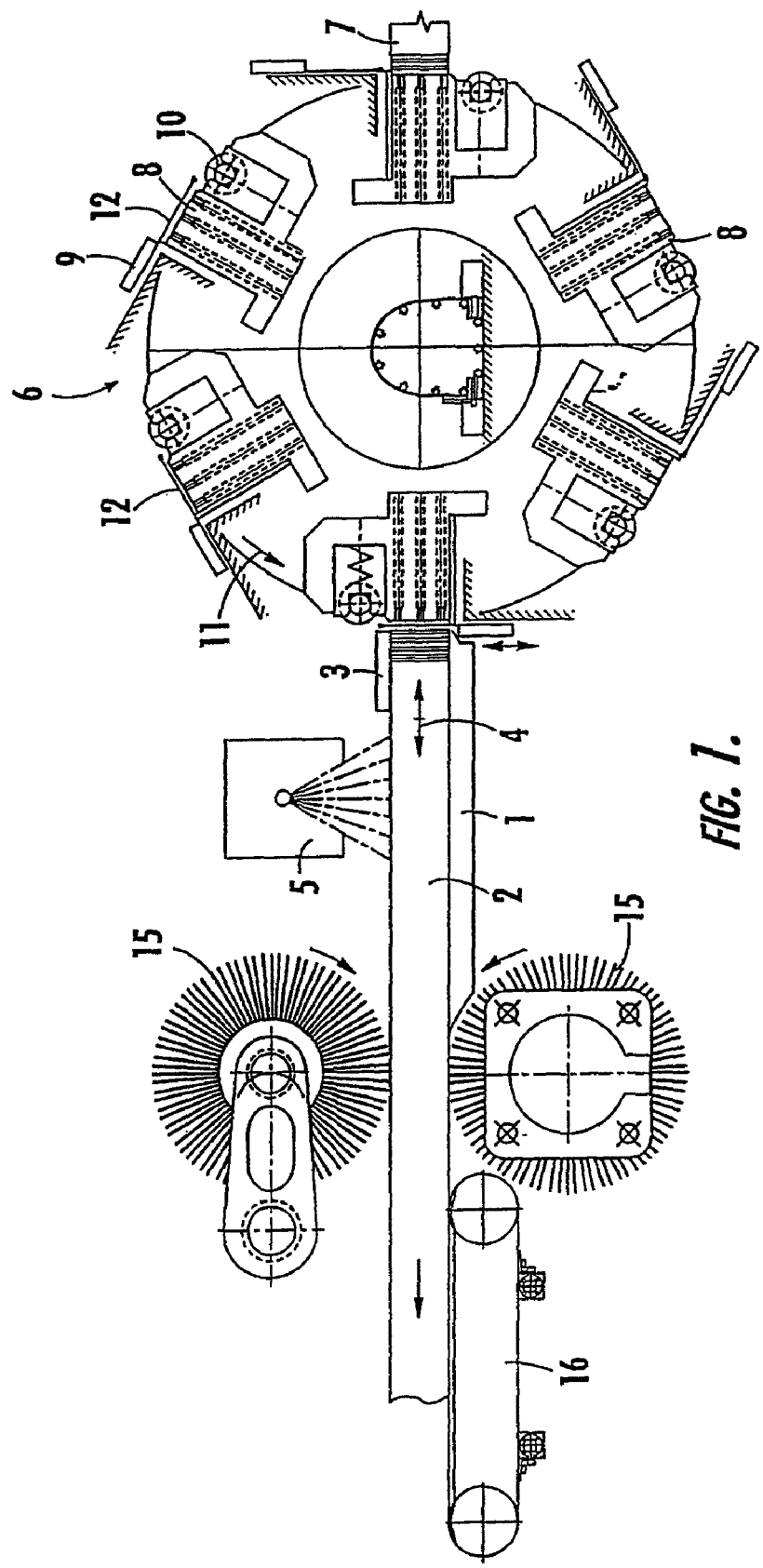
FIG. 1 shows an overall view of the device in schematic form.

FIG. 1 shows a table 1 for the guidance of the newly produced hobe-material block 2, in accordance with one embodiment of the present invention. At the front end of the table 1, there is an open-ended magazine 3 with a securing mechanism (not shown) through which the block 2 can be positioned, subject to an adjustable pressure, vertically towards the production direction. The table 1 with the open-ended magazine 3 can be moved or positioned back and forth in the directions indicated by the arrows 4 via a mechanism, which is not shown in this drawing. An infrared radiator 5 is positioned towards the production direction, behind the open-ended magazine 3, above the hobe block 2, through which the hobe block 2 can be heated to its plastic deformation temperature. In the production direction behind the table 1 there is a pair of expansion-rollers 15, which grab the block 2 from the magazine 3 and thus cause the expansion to take place, turning block material into honeycomb material. For the execution version shown in the drawings, the expansion-rollers 15 were equipped with brushes. The distance between the upper roller and the lower roller 15 is adjustable, in concert with the height of the block 2 and the desired pressure. Towards the production direction, behind the expansion-rollers 15, there is a conveyor belt 16, which is intended to accept and transport the expanded block.

Between the open-ended magazine 3 and the cut magazine 7, there is a rotor 6, held in bearings to permit circular motion, which extends along the entire cut width. The rotor is connected to a cyclical drive mechanism, which is not shown in the drawing. It is equipped with six stations spaced equally along its circumference, each of which transports one cut or strip, provides it with a welding strip and presses it into the hobe block 2, in front of the magazine 3. Every station essentially encompasses three units, specifically a radially adjustable and bar-shaped strip carrying mechanism 8, a tangentially adjustable strip heating mechanism 9, situated in front of the strip carrying mechanism 8, and a roller shaped pressure mechanism 10. These three units essentially extend across the entire width (vertical to the plan view) of the rotor 6. Motion of the strip carrying mechanism 8 and the comb-shaped strip heating mechanism 9 are guided and driven pneumatically and centrally through a mechanism which is not shown on the drawing. The pressure mechanism 10 generally consists of a spring loaded roller, which, in concert with the turning motion of the roller, presses the cut, which has been provided with welding strips, from the top, downwards towards the hobe block 2 and thereby completes the welding process through which the newly cut and positioned strip is attached to the hobe block 2.

The mode of operation of this device is as follows: In front of the cut magazine 7, the strip carrying mechanism 8 is activated, while the strip heating mechanism 9 is pulled back, whereby a cut or strip is taken on by the carrying mechanism 8, from the cut magazine 7. During the turning motion of the rotor 6, in the direction of the arrows 11, the strip heating mechanism 9 is already driven forward so that the cut which has just been taken over is positioned between the strip carrying mechanism 8 and comb-shaped strip heating mechanism 9. During this process, the strip carrying mechanism 8 remains in a position, which is driven backwards away from the strip heating mechanism 9. As soon as this station has completed three cycles and has assumed a position in front of the open-ended magazine 3, the strip carrying mechanism 8 with the cut or strip, on the table 1, on the one hand, is moved so close to the open-ended magazine 3 and the hobe material block 2, on the other hand, that they can be contacted by the fingers 12 of the comb-shaped strip heating mechanism 9. The fingers 12 heat the locations of the cut and the block contacted by the fingers. Next the comb-shaped strip heating mechanism 9 is pulled back between the cut on the strip carrying mechanism 8 and the hobe material block 2, whereby the welding strips are formed through contact between the opposing surfaces of the cuts and the hobe material block 2. Finally, the strip carrying mechanism 8 with the cut and the open-ended magazine 3 with the hobe material block 2 are moved more closely toward one another, until the welding strips come in contact with one another. Following this last step, the strip carrying mechanism 8 and the open-ended magazine 3 once again separated and the rotor 6 cycles forward. During this process, the roller of the pressure mechanism 10 of this station rolls over the welded cut, whereby a new pressure and forward or pushing motion of the hobe material block 2 is created, which yields a distance equivalent to the thickness of the cut or strip. These partial processes repeat themselves as soon as the next station of the rotor 6 has moved into position in front of the hobe material block 2.

Figure 2:
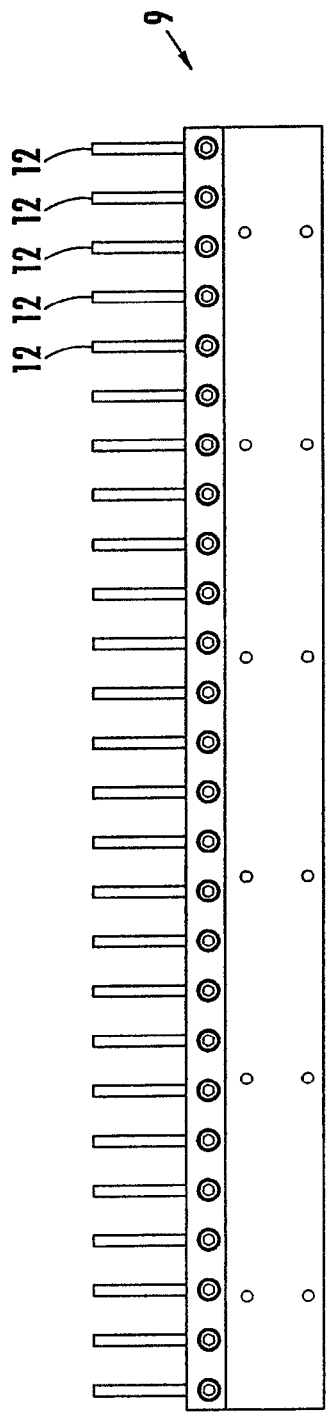
FIG. 2 shows a frontal view of the chamber-like strip heating mechanism, in an enlarged scale.

FIG. 2 shows a frontal view of the strip heating mechanism whose chamber-like heating elements or fingers 12 are heated electrically to the required temperature in order to effect the welding bonds between strips or cuts of the thermoplastic material.

Figure 3:
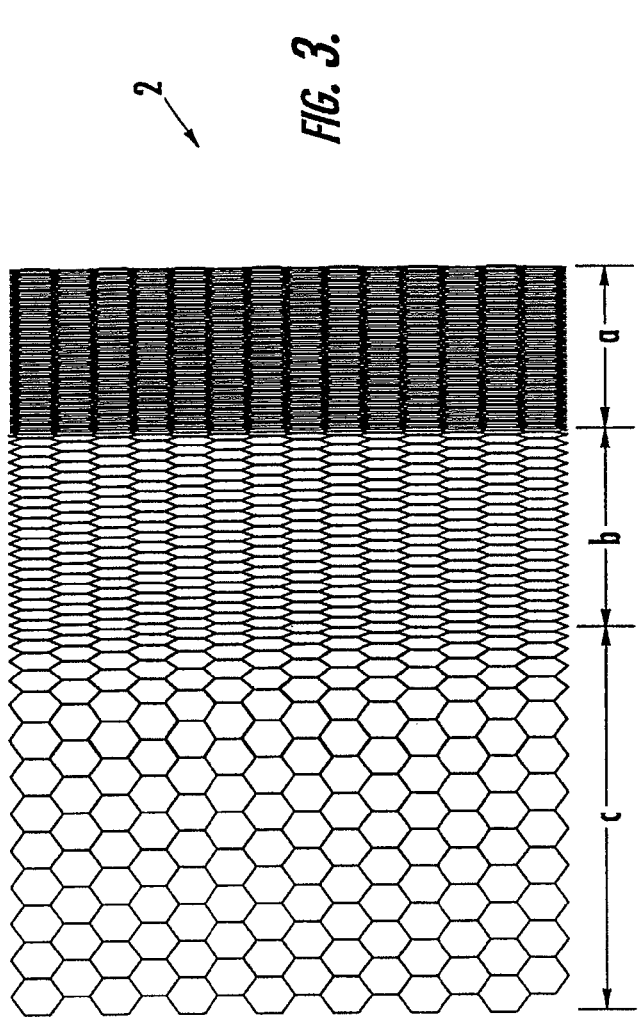
FIG. 3 illustrates the produced block rank in the expansion phase.

FIG. 3 shows the hobe material block 2 during a three part transition from the non-expanded hobe block material in area a, through the partially expanded status in area b, to a substantially expanded status in area c. The heating via the infrared radiator 5 occurs at least partially in area b, so that the radiant heat can reach the inside of the block 2.

That which is claimed:

1. A method for joining multiple pieces of thermoplastic material to form a cellular block, comprising:
   positioning a new piece to be added to the cellular block in opposing face-to-face relation with a last piece most recently previously welded to the cellular block; and
   forming multiple spaced apart and elongate welds between the new piece and the last piece while the new piece and the last piece are in the opposing face-to-face relation, so that each of the welds extends in a longitudinal direction and the welds are spaced apart from one another in a lateral direction,
   the forming step comprising positioning a heating device, having a plurality of heating fingers that extend in the longitudinal direction and are spaced apart in the lateral direction, between the last piece on the block and the new piece to be joined to the block and in contact with the opposing surfaces of the new piece and the last piece and causing the heating fingers to heat the new piece and the last piece at locations contacted by the heating fingers, and retracting the heating fingers from between the new piece and the last piece and then pressing the new piece against the last piece such that the new piece is welded to the last piece at said locations.

2. The method of claim 1, wherein the pressing step comprises operating a pressing device to press the new piece against the last piece after the heating fingers are retracted.

3. The method according to claim 1, further comprising after forming providing a step for heating the cellular block to at least the point of plastic deformation and expanding the cellular block to convert the cellular block into honeycomb material.

4. The method according to claim 3 further comprising repeating each of the steps for each of a plurality of further pieces.

5. A method according to claim 1, wherein the pieces include nonwoven thermoplastic fabric.

6. A method according to claim 1, wherein the pressing the new piece against the last piece includes engaging a rolling mechanism against, and at the same time rolling the rolling mechanism across, at least one of the new piece and the last piece.

7. A method according to claim 6, wherein the pieces include nonwoven thermoplastic fabric.

* * * * *